United States Patent [19]

Davidson

[11] 4,145,840
[45] Mar. 27, 1979

[54] FASTENING DEVICE

[76] Inventor: Charlton R. Davidson, 2034 Caprock Dr., Richardson, Tex. 75080

[21] Appl. No.: 882,223

[22] Filed: Feb. 28, 1978

[51] Int. Cl.$^2$ ................. E04G 3/00; A01G 17/06
[52] U.S. Cl. ......................... 47/44; 151/41.75;
248/217.2; 248/221.4; 248/226.5; 24/213 C;
24/230 R; 85/83
[58] Field of Search ............... 151/41.75; 47/44;
85/5 R, 50 R, 82–83, 84, 63; 248/217.2, 220.3,
221.4, 226.5; 52/489; 24/230 R, 213 B, 213 C,
215

[56] References Cited

U.S. PATENT DOCUMENTS

| 2,184,783 | 12/1939 | Tinnerman | 151/41.75 X |
| 3,400,743 | 9/1968 | Strange | 85/83 X |
| 3,815,756 | 6/1974 | Cox | 248/221.4 X |
| 4,041,668 | 8/1977 | Jahn et al. | 52/489 |

FOREIGN PATENT DOCUMENTS

| 433876 | 11/1925 | Fed. Rep. of Germany | 248/217.2 |
| 679093 | 7/1939 | Fed. Rep. of Germany | 248/221.4 |
| 125330 | 6/1949 | Sweden | 47/44 |
| 418821 | 10/1934 | United Kingdom | 47/44 |
| 556544 | 10/1943 | United Kingdom | 151/41.75 |

Primary Examiner—Robert E. Bagwill
Attorney, Agent, or Firm—Hubbard, Thurman, Turner, Tucker & Glaser

[57] ABSTRACT

A generally U-shaped clip of spring steel is adapted for holding plants in a predetermined position along a brick wall or the like. The clip comprises generally flat legs extending outwardly from a bend at a relatively wide angle when the clip is in its untensioned state. The free ends of the legs are separated by a greater distance in such untensioned state than the distance between adjacent bricks at a mortar joint of the brick wall. By forcing the legs together, the clip can be installed in the crevice at the mortar joint with the free ends of the legs engaging the opposed surfaces of adjacent bricks. The spring tension retained by the clip when installed in the crevice secures the clip to the wall by frictional engagement with the surfaces of the adjacent bricks. A suitable retainer, such as a twist of wire attached to the bend of the clip, permits vines or the like to be fastened in place against the wall.

8 Claims, 9 Drawing Figures

FASTENING DEVICE

BACKGROUND OF THE INVENTION

The present invention pertains generally to fastening devices for supporting light-weight objects against an upstanding structure, and more particularly to resiliently held wall ties for installation in the crevices of brick walls and the like for supporting such objects as the vines of a climbing plant.

Those familiar with the horticultural art of growing so-called climbing plants along building walls and other supporting structures will appreciate that certain varieties of vine-like plants, such as English Ivy, are very adept at climbing, whereas others are much less adept and need support at points on the wall to achieve the desired arrangement. It will also be appreciated that providing wall ties to brick walls for such climbing plants has been a troublesome problem in the art. The attachment of relatively permanent wall ties, such as threaded hooks, can be achieved by drilling or tapping into the mortar between bricks. However, such relatively permanent wall ties are time consuming to install, are inflexible for rearrangement purposes, and leave an unsatisfactory appearance when removed. The use of relatively nonpermanent wall ties, such as adhesive tape and the like, have heretofore been generally undesirable both aesthetically and functionally.

It would be desirable, therefore, to employ a fastening device that is easier to install than the various relatively permanent wall ties, that permits flexibility in rearrangement, that is aesthetically satisfactory when installed, and that leaves no hole or other defacing feature when removed.

SUMMARY OF THE INVENTION

The present invention concerns a fastening device for supporting relatively light-weight objects, such as the vines of a climbing plant, against the walls of an upstanding structure. The inventive fastening device comprises a unitary resilient member having first and second generally flat leg portions joined at a bend portion to provide a generally U-shaped structure, the member having an untensioned state wherein the legs are disposed in intersecting planes at a first angle and having a tensioned state wherein the legs are disposed in intersecting planes at a second angle, the second angle being smaller than the first angle such that the free ends of the legs are closer in the tensioned state than in the untensioned state, whereby the free ends of the legs while in the tensioned state can be inserted into a crevice or slot in a support structure and released to a second tensioned state with the free ends of the legs engaging the surfaces of the support structure in the crevice or slot such that the legs are disposed at an angle intermediate the first and second angles, and whereby the retained force of the resilient member in the second tension state causes the free ends of the legs to be held in the crevice or slot by frictional engagement with the surfaces of the support structure in contact therewith; and means disposed at the bend of the resilient member for retaining objects to be supported at least partially by the support structure.

The novel features believed characteristic of the invention are set forth in the appended claims. The nature of the invention, however, as well as its essential features and advantages may be understood more fully upon consideration of illustrative embodiments, when read in conjunction with the accompanying drawings, wherein:

DESCRIPTION OF THE PREFERRED EMBODIMENTS

Figure 1:
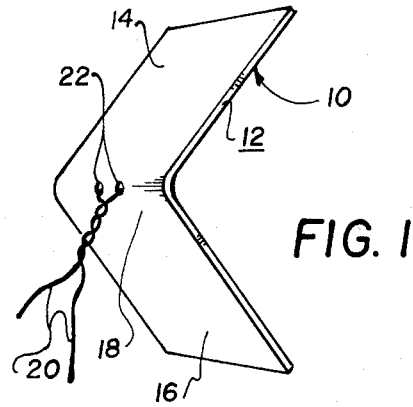
FIG. 1 is a perspective view of a fastening device in accordance with the present invention.

Referring now to the drawings, several illustrative examples of the inventive fastening device will be described, similar numerals designating similar elements in all figures of the drawings.

Figure 2:
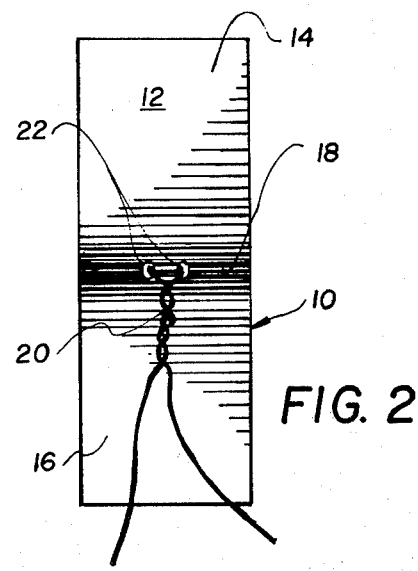
FIG. 2 is a frontal view thereof.
Figure 3:
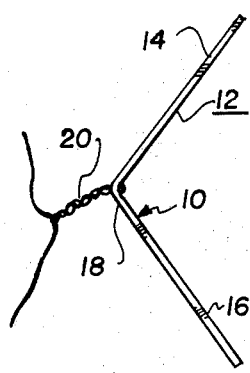
FIG. 3 is a side view thereof.

With particular reference to FIGS. 1–3, a fastening device or wall tie of the present invention is illustrated and designated generally by reference numeral 10. In its simplest form the inventive fastening device 10 comprises a generally U-shaped or V-shaped resilient member or clip 12. The clip 12 is a unitary structure preferably formed from a flat sheet of spring steel to provide upper and lower leg portions 14 and 16 lying in intersecting planes as clearly depicted in FIG. 1. The legs 14 and 16 preferably extend out an equal distance from a curved middle portion or bend 18. A retainer, such as a twist of wire 20, is secured to the clip 12 at the bend 18 in a suitable manner as by threading through holes 22.

Figure 4:
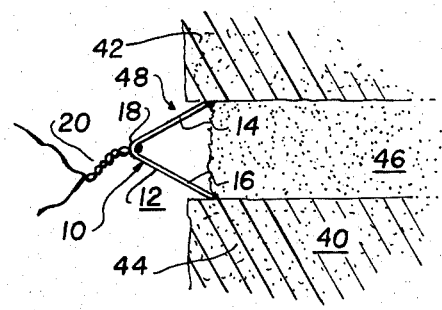
FIG. 4 is a vertical cross section of a portion of a brick wall at a mortar joint illustrating the fastening device of FIGS. 1–3 installed therein.

Referring now to FIG. 4 a preferred method of installation of the fastening device 10 will be described in connection with a typical brick wall 40, whereby the fastening device 10 once installed therein will permit attachment of various relatively light-weight objects thereto without defacing the wall 40. Shown are upper and lower adjacent bricks 42 and 44 separated by mortar 46, the mortar 46 being recessed slightly from the edges of the bricks 42 and 44 to form a crevice 48 thereat as depicted. When the clip 12 is in its relaxed or untensioned state, the legs 14 and 16 lie in intersecting planes at a first angle exemplified by FIG. 3. By forcing the legs 14 and 16 closer together so that they are disposed at a second smaller angle, the free ends of the legs 14 and 16 can be inserted into the crevice 48 and then released to snap into engagement with the opposed surfaces of the bricks 42 and 44 as exemplified by FIG. 4. It will be appreciated that the clip 12 should be constructed so that the free ends of the legs 14 and 16 are separated by a greater distance in the untensioned state than the distance at the crevice 48 separating the bricks 42 and 44. Thus, when the fastening device 10 is installed in the brick wall 40 as depicted in FIG. 4, the clip 12 will be in a state of tension such that a retained spring-force in the clip 12 will cause the legs 14 and 16 to resiliently engage the bricks 42 and 44.

With the fastening device 10 installed in the brick wall 40 in such manner, the free ends of the wire twist 20 can be used to tie a vine of a plant or the like (not shown) against the wall 40, whereby frictional engagement of the clip 12 with the bricks 42 and 44 is sufficient to retain such vine in place. It will be appreciated that a multiplicity of fastening devices 10 can be arranged and rearranged with ease in any number of desired patterns without damaging or defacing the wall 40 in any respect.

Figure 5:
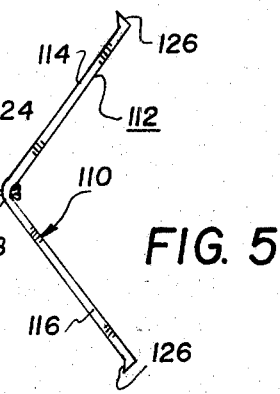
FIG. 5 is a side view similar to FIG. 3 illustrating an alternate embodiment of the inventive fastening device.

Referring now to FIG. 5, another embodiment of the inventive fastening device is illustrated and designated generally by reference numeral 110. The device 110 is similar in many respects to the previously described fastening device 10 in that the device 110 comprises a similarly constructed clip 112 having legs 114 and 116 resiliently joined at a bend 118. However, the fastening device 110 illustrates a different type of retainer in the form of an eyelet 124, which is affixed to the clip 112 in a suitable manner as by riveting at the bend 118. In addition, the legs 114 and 116 are each equipped with one or more small conical projections, cleats, or spiked feet 126, the operation of which will presently be described.

Figure 6:
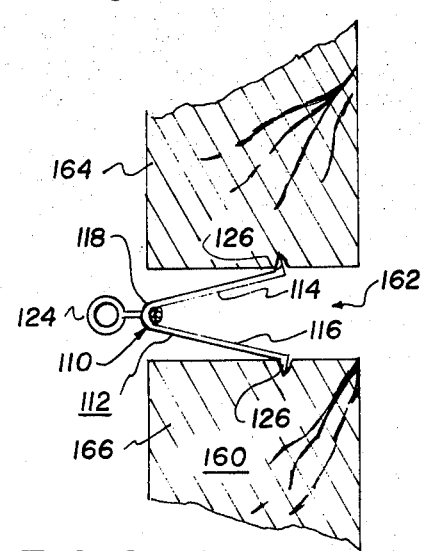
FIG. 6 is a vertical cross section of a portion of a wooden fence illustrating the fastening device of FIG. 5 installed in a slot between adjacent boards of the fence.

Although the fastening device 110 may be installed in a crevice formed at a mortar joint of a brick wall in the above-described manner, the device 110 is particularly adapted for use with a wooden fence 160 as illustrated in FIG. 6. By compressing the clip 112 to bring the free ends of the legs 114 and 116 sufficiently close together, the device 10 can be installed in a slot 162 between adjacent boards 164 and 166 of the fence 160. When the clip 112 is released therebetween, the cleats 126 are resiliently driven into the boards 164 and 166 so as to embed themselves slightly in the wood without serious damage thereto. The deployment exemplified by FIG. 6 is particularly useful in arranging the canes of climbing roses against a wooden board fence by threading string or the like (not shown) through the eyelet 124 and tying the rose plant in the desired manner therewith.

Figure 7:
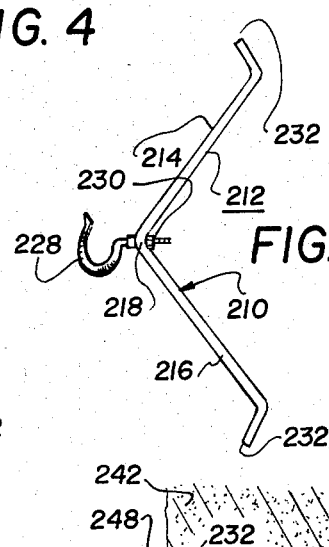
FIG. 7 is a side view similar to FIGS. 3 and 5 illustrating another alternate embodiment of the inventive fastening device.
Figure 8:
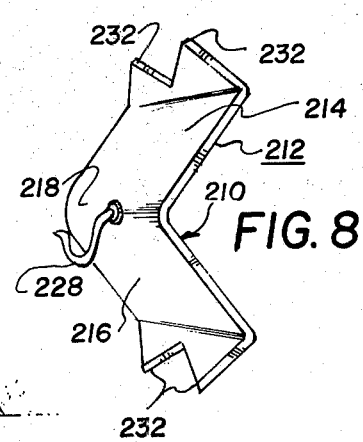
FIG. 8 is a perspective view of the embodiment of FIG. 7.

Referring now to FIGS. 7 and 8, still another embodiment of the inventive fastening device is illustrated and designated generally by reference numeral 210. The device 210 comprises a clip 212 of similar construction to the previously described clips 12 and 112, wherein legs 214 and 216 are resiliently joined at a bend 218. Still another type of retainer is illustrated in the form of a hook 228, which is preferably affixed to the clip 212 by a nut 230 or suitable means for permitting varying the relative orientation of the hook 228 with respect to the clip 212. Thus, the fastening device 10 can be adapted for installation in a vertical slot or crevice (not shown) by rotating the hook 228 ninety degrees from the orientation shown.

In accordance with an important aspect of the fastening device 210 of FIGS. 7 and 8, the clip 212 is equipped with integrally formed pointed tips 232 at the free ends of the legs 214 and 216. The clip 212 can be formed with such pointed tips 232 by means of conventional tool and die stamping techniques using an annealed sheet of spring steel and thereafter hardening the steel to obtain the desired resiliency.

Figure 9:
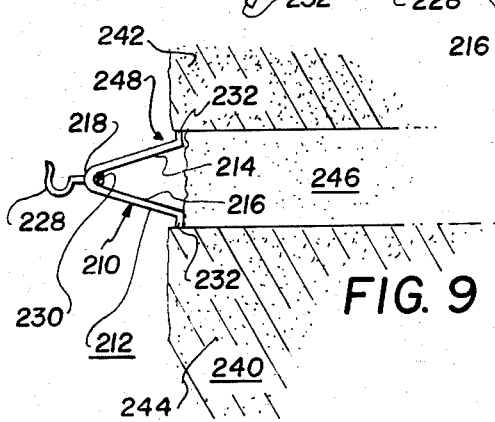
FIG. 9 is a vertical cross section similar to FIG. 4 of a portion of a brick wall illustrating the fastening device of FIGS. 7 and 8 installed therein.

In FIG. 9, the fastening device 210 is shown installed in a brick wall 240, similar to the wall 40 previously described. The legs 214 and 216 of the clip 212 are inserted between adjacent bricks 242 and 244 where recessed mortar 246 forms a suitable crevice 248. The pointed tips 232 tend to lodge in relatively small irregularities in the surfaces of the bricks 242 and 244, thereby enabling the fastening device 210 to support greater loads. Thus, relatively light-weight decorative objects and the like can be hung from the hook 228 without the necessity of drilling or tapping into the mortar 246, or otherwise defacing the wall 240. Most preferably, the pointed tips 232 should engage the surfaces of the bricks 242 and 244 at roughly right angles as shown. Accordingly, the tips 232 are each oriented at a slightly obtuse angle with respect to the corresponding legs 214 and 216.

Although the several illustrative examples of the inventive fastening device has been described herein as preferably comprising spring steel, various other flexible resilient materials can be employed in the construction of the clips 12, 112 and 212 with very satisfactory results. Examples of satisfactory alternate clip-construction materials include thermoplastic resins such as polystyrene, polyvinyl chloride, acrylic polymers and combinations thereof.

Those skilled in the art will appreciate that the present invention has a wide range of utility for fastening various relatively light-weight objects to various upstanding structures as exemplified by the above-described illustrative embodiments. Although several preferred embodiments of the inventive fastening device have been described in detail, it is to be understood that various changes, substitutions, and alterations can be made therein without departing from the spirit and scope of the invention as defined by the appended claims.

What is claimed is:

1. A fastening device comprising:
   a unitary resilient member having first and second generally flat leg portions joined at a bend portion to provide a generally U-shaped structure, the resilient member having an untensioned state wherein the legs are disposed in intersecting planes at a first angle and having a tensioned state wherein the legs are disposed in intersecting planes at a second angle, the second angle being smaller than the first angle such that the free ends of the legs are closer in the tensioned state than in the untensioned state, whereby the free ends of the legs while in the tensioned state can be inserted into a crevice or slot in a support structure and released to a second tensioned state with the free ends of the legs engaging the surfaces of the support structure within the crevice or slot such that the legs are disposed at an angle intermediate the first and second angles, and whereby the retained force of the resilient member in the second tensioned state causes the free ends of the legs to be held in the crevice or slot by frictional engagement with the surfaces of the support structure in contact therewith; and
   means disposed at the bend of the resilient member for retaining objects to be supported at least partially by the support structure;
   said resilient member having projections angularly disposed at the free ends of the legs, said projections comprising spiked feet cooperatively disposed at points of engagement of the clip with the support structure, whereby the spiked feet embed themselves in the surfaces of the support structure in response to the force retained by the resilient member.

2. The fastening device of claim 1 wherein the projections comprise pointed tips integrally formed with the resilient member at the free ends of the legs, the pointed tips being oriented with respect to the legs to engage opposed surfaces of the support structure at roughly right angles therewith.

3. The fastening device of claim 1 wherein the resilient member comprises spring steel.

4. The fastening device of claim 1 wherein the resilient member is comprised of a thermoplastic resin.

5. The fastening device of claim 1 wherein the retaining means comprises a wire twist fastened to the resilient member at the bend.

6. The fastening device of claim 1 wherein the retaining means comprises an eyelet fastened to the resilient member at the bend.

7. The fastening device of claim 1 wherein the retaining means comprises a hook rotatably fastened to the resilient member at the bend.

8. A method of fastening a vine or cane of a plant to a support structure having a crevice or slot therein, comprising the steps:
- compressing a generally U-shaped member to a first tensioned state,
- inserting the free ends of the resilient member into the crevice or slot,
- releasing the resilient member to a second tensioned state with the free ends of the resilient member engaging the surfaces of the support structure in the crevice or slot, and
- tying the vine or cane to the resilient member.

* * * * *